US 11,415,984 B2

United States Patent
Tanaka (10) Patent No.: US 11,415,984 B2
(45) Date of Patent: Aug. 16, 2022

(54) AUTONOMOUS DRIVING CONTROL DEVICE AND METHOD

(71) Applicant: Hitachi Automotive Systems, Ltd., Hitachinaka (JP)

(72) Inventor: Yuya Tanaka, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 156 days.

(21) Appl. No.: 16/645,852

(22) PCT Filed: Sep. 20, 2018

(86) PCT No.: PCT/JP2018/034735
§ 371 (c)(1),
(2) Date: Mar. 10, 2020

(87) PCT Pub. No.: WO2019/065429
PCT Pub. Date: Apr. 4, 2019

(65) Prior Publication Data
US 2020/0264610 A1    Aug. 20, 2020

(30) Foreign Application Priority Data
Sep. 29, 2017  (JP) .............................. JP2017-190462

(51) Int. Cl.
*G05D 1/00* (2006.01)
*B60W 60/00* (2020.01)
(Continued)

(52) U.S. Cl.
CPC ......... *G05D 1/0088* (2013.01); *B60W 60/001* (2020.02); *G01C 21/32* (2013.01);
(Continued)

(58) Field of Classification Search
CPC .. G05D 1/0088; G05D 1/0278; G05D 1/0212; G05D 1/0274; G05D 1/0276;
(Continued)

(56) References Cited

U.S. PATENT DOCUMENTS

2002/0193944 A1*  12/2002  Stewenius .............. G01C 21/30
                                                                701/469
2013/0238648 A1*  9/2013  Fujiwara ................ G01C 21/32
                                                                707/758

(Continued)

FOREIGN PATENT DOCUMENTS

JP          2014-219829 A       11/2014
JP          2017-83446 A         5/2017
(Continued)

OTHER PUBLICATIONS

International Search Report (PCT/ISA/210) issued in PCT Application No. PCT/JP2018/034735 dated Jan. 8, 2019 with English translation (four (4) pages).
(Continued)

*Primary Examiner* — Elaine Gort
*Assistant Examiner* — Ellis B. Ramirez
(74) *Attorney, Agent, or Firm* — Crowell & Moring LLP (57) ABSTRACT

An autonomous driving control device includes a map information input unit, a new map information storage unit, and a calculation unit. The map information input unit includes several input means and several processing means. The calculation unit performs the autonomous driving using
(Continued)

the new map information obtained by accessing the new map information storage unit.

7 Claims, 7 Drawing Sheets

(51) Int. Cl.
    *G01C 21/32*         (2006.01)
    *G05D 1/02*         (2020.01)

(52) U.S. Cl.
    CPC ......... *G05D 1/0274* (2013.01); *G05D 1/0276* (2013.01); *B60W 2556/50* (2020.02)

(58) Field of Classification Search
    CPC ........... B60W 60/001; B60W 2554/80; B60W 2556/50; B60W 30/18154; B60W 2552/10; B60W 2552/53; B60W 30/14; B60W 40/10; B60W 40/02; B60W 50/14; B60W 2552/00; B60W 2050/0026; B60W 2050/146; B60W 40/06; G08G 1/0969; G08G 1/096827; G01C 21/3446; G01C 21/32; G01C 21/3822; B60Y 2300/18158
    USPC ............ 701/26, 25, 41, 48, 60, 65; 340/465, 340/466, 467; 342/69, 71
See application file for complete search history.

(56) References Cited

U.S. PATENT DOCUMENTS

| | | | |
|---|---|---|---|
| 2014/0330498 A1* | 11/2014 | Nara | B60W 10/06 |
| | | | 701/70 |
| 2017/0122754 A1 | 5/2017 | Konishi et al. | |
| 2018/0189323 A1* | 7/2018 | Wheeler | G01C 21/00 |
| 2019/0084579 A1* | 3/2019 | Maura | G05D 1/0212 |
| 2019/0204091 A1* | 7/2019 | Williams | G01C 21/32 |
| 2020/0378788 A1* | 12/2020 | Fujita | G09B 29/00 |

FOREIGN PATENT DOCUMENTS

| | | |
|---|---|---|
| JP | 2017-146131 A | 8/2017 |
| JP | 2017-156704 A | 9/2017 |
| WO | WO 2010/100715 A1 | 9/2010 |

OTHER PUBLICATIONS

Japanese-language Written Opinion (PCT/ISA/237) issued in PCT Application No. PCT/JP2018/034735 dated Jan. 8, 2019 (four (4) pages).

* cited by examiner

AUTONOMOUS DRIVING CONTROL DEVICE AND METHOD

TECHNICAL FIELD

The present invention relates to autonomous driving control device and method configured to perform autonomous driving using map information, and more particularly to autonomous driving control device and method having an improved interface with map information.

BACKGROUND ART

In recent years, vehicle autonomous driving realized by vehicles equipped with autonomous driving control systems has been put to practical use, and there have been a lot of proposals on implementation techniques thereof.

For example, PTL 1 proposes an autonomous driving control system configured as "an autonomous driving system mounted on a vehicle including: a navigation device that searches for a route from a current position of the vehicle to a destination; a high precision map unit that generates detail information of the route based on the searched route and map information; and an autonomous driving control device that performs automatic control of acceleration and deceleration and steering of the vehicle using at least the detail information, the high precision map unit dividing the route into a plurality of block regions and outputting the detail information currently required for the automatic control out of the detail information corresponding to the plurality of block regions to the autonomous driving control device in a unit of block region".

CITATION LIST

Patent Literature

PTL 1: JP 2017-83446 A

SUMMARY OF INVENTION

Technical Problem

As illustrated in PTL 1, the autonomous driving control system is constituted by many electronic devices that are unitized. In this case, the navigation device, the high precision map unit, and the autonomous driving control device correspond to the electronic devices referred to herein. Further, there is a relationship that the navigation device and a high precision map unit, which are peripheral devices with respect to the autonomous driving control device serving as the main electronic device, provide various types of information to the autonomous driving control device.

However, there is a case where electronic devices manufactured by different companies are used when forming an autonomous driving control system by assembling many unitized electronic devices. In this case, even if the main specifications of the electronic devices are unified, it is necessary to sufficiently confirm the consistency among the electronic devices at the time of actual embedding and operating.

In particular, regarding the high precision map unit and the autonomous driving control device, it is necessary to confirm that the autonomous driving control device can perform autonomous driving within a desired accuracy range based on the map information given by the high precision map unit, but it takes a lot of manpower to verify the entire map information in various cases. In particular, a map format is independently developed by each map company, and an application developer needs to understand the format and proceed with development each time, and thus, there occurs a problem that the man-hour for the development increases. Further, even when such confirmation work is performed by the same company, similar confirmation work is separately generated for a different type of high precision map unit.

In view of the above, an object of the present invention is to provide autonomous driving control device and method capable of reducing assembling and confirmation work of a high precision map unit and an autonomous driving control device.

Solution to Problem

From the above circumstances, in the present invention, there is provided "an autonomous driving control device including: a map information input unit configured to input external map information; a new map information storage unit in which new map information formed based on the input map information is initially stored; and a calculation unit which performs autonomous driving using the new map information, the map information input unit including: a first input means that acquires road points contained in the external map information; a first processing means that generates a road region from the road points; a second processing means that generates pre-connections and post-connections for the road region; a second input means that acquires shape interpolation points for a road contained in the external map information; a third processing means that generates information about lanes from the shape interpolation points for the road contained in the external map information; a fourth processing means that generates pre-connections, left and right connections, and post-connections for the lanes; and a fifth processing means that generates a storage area of the road region in the new map information storage unit, hierarchically constitutes a storage area of lane information within the storage area of the road region, and stores the road points and the shape interpolation points for the road, and information generated from the road points and the shape interpolation points for the road as new map information, and the calculation unit performing the autonomous driving using the new map information obtained by accessing the new map information storage unit".

Further, in the present invention, there is provided "an autonomous driving control method for inputting external map information, initially storing new map information formed from the input map information, and performing autonomous driving using the new map information, the method including: acquiring road points contained in the external map information and generating a road region and pre-connections and post-connections for the road region from the road points, acquiring shape interpolation points for a road contained in the external map information and generating information about lanes from the shape interpolation points, and generating pre-connections, left and right connections, and post-connections for the lanes; generating a storage area of the road region for temporary storage of the new map information, hierarchically constituting a storage area of lane information within the storage area of the road region, and storing the road points and the shape interpolation points for the road, and information generated from the road points and the shape interpolation points for the road as new map information; and performing the autonomous driving using the stored new map information".

Further, in the present invention, there is provided "an autonomous driving control device including a calculation unit that performs automatic operation using external map information, the calculation unit acquiring road point information and road shape interpolation point information from the external map information and generating and using a road region and lane connection information in the computation unit".

Advantageous Effects of Invention

It is possible to reduce the labor of assembling and confirmation work of the high precision map unit and the autonomous driving control device.

DESCRIPTION OF EMBODIMENTS

Hereinafter, an embodiment of the present invention will be described in detail with reference to the drawings.

Embodiment

First, an outline of a vehicle equipped with the autonomous driving control device of the present invention will be described with reference to FIG. 2.

Figure 2:
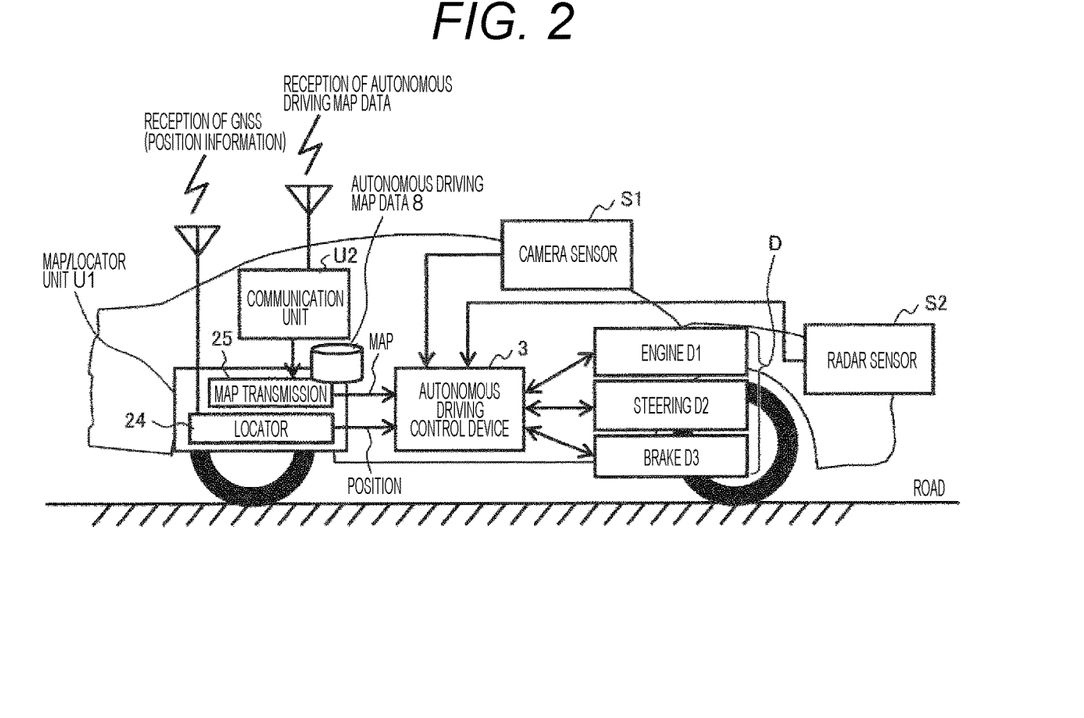
FIG. 2 is a diagram illustrating an outline of a vehicle equipped with the autonomous driving control device of the present invention.

The autonomous driving control system mounted on the actual vehicle illustrated in FIG. 2 is roughly constituted by an autonomous driving control device 3, a map/locator unit U1, sensors S, and vehicle control units Dr. Among them, the autonomous driving control device 3 obtains map information and position information from the map/locator unit U1 and obtains position information of a three-dimensional object from a camera sensor S1 and position information of the three-dimensional object from a radar sensor S2, the camera sensor S1 and the radar sensor S2 serving as the sensors, and determines each operation target amount of an engine D1, a steering D2, a brake D3, and the like which are the vehicle control units Dr. Incidentally, the map/locator unit U1 includes a map transmission function 25 and a locator function 24, the locator function 24 receives GNSS (position information) to determine a host vehicle position, and the map transmission function 25 includes a communication unit U2 that receives the autonomous driving map data 8.

In the present invention, an interface among the map transmission function 25 corresponding to a high precision map unit, an autonomous driving map database 8, and the autonomous driving control device 3 has been devised. Here, a map information input section of the autonomous driving control device 3 manufactured by a host company is improved so as to be capable of reducing the labor for confirmation work after assembling even with various types of high precision map units including those manufactured by other companies.

Figure 3:
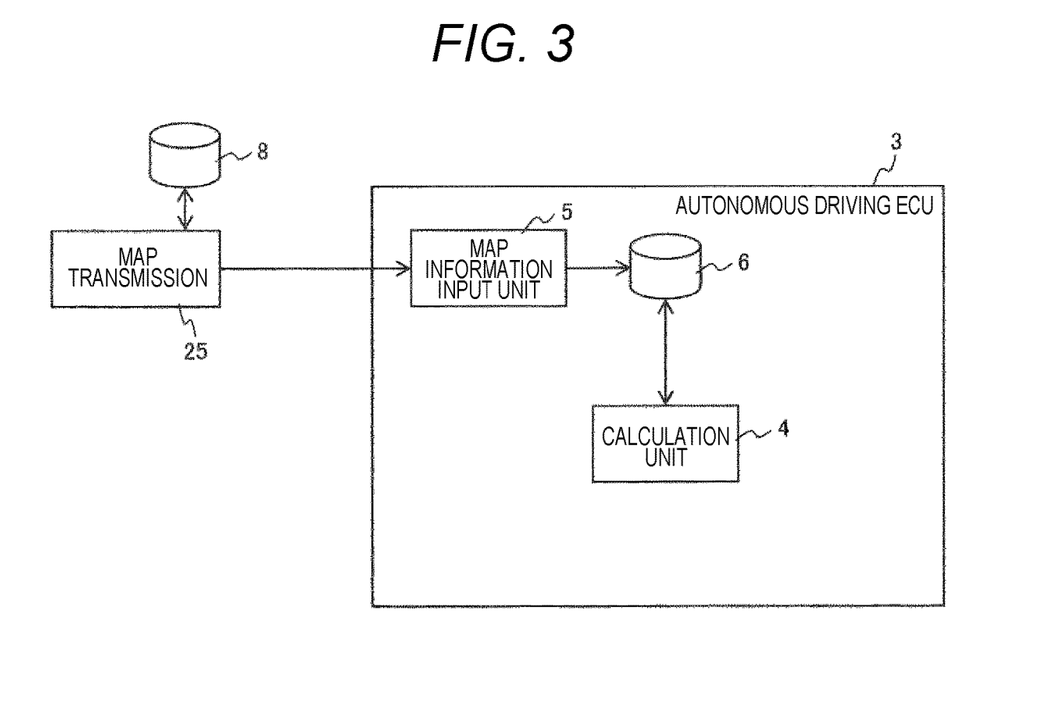
FIG. 3 is a diagram illustrating a hardware configuration of an autonomous driving control device 3 according to the present invention.

FIG. 3 illustrates a hardware configuration of the autonomous driving control device 3 according to the present invention. Although the autonomous driving control device 3 has various functions, a calculation unit 4 which is a function of a computer, a map information input unit 5 to which map information from the map transmission function 25 is input, and a new map information storage unit 6 that initially stores new map information formed from the input map information are mainly described herein, and the calculation unit 4 accesses the new map information storage unit 6 to obtain the new map information and executes autonomous driving based on the obtained new map information when performing the autonomous driving.

Figure 1:
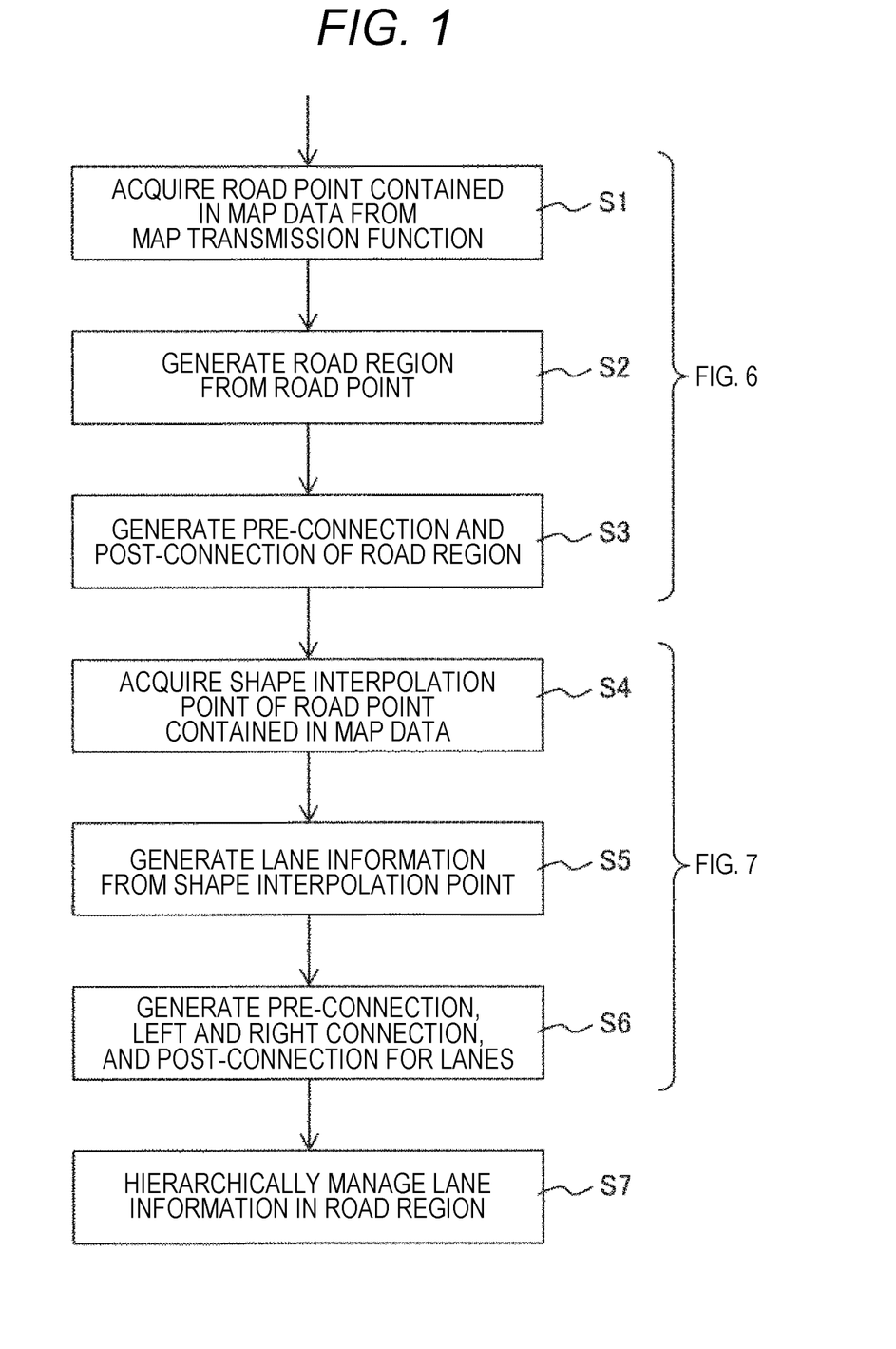
FIG. 1 is a flowchart illustrating processing contents of a map information input unit 5.

FIG. 1 is a flowchart illustrating processing contents of the map information input unit 5. When describing an outline of this flowchart first, this flow is executed at an appropriate cycle in the map information input unit 5 so that processing is started.

According to the flowchart of FIG. 1, road points indicating nodes set on a road are acquired from the map data contained in the autonomous driving map database 8 in the first Processing Step S1. Here, the road point refers to a point placed at a point where there is a significant change in road shape such as branching, merging, and an intersection. Further, points may be scored using a change of a line color (a yellow line or a white line), a tunnel entrance, an exit, a tollgate, and the like as separators.

In Processing Step S2, a road region is generated from the acquired road points.

In Processing Step S3, pre-connections and post-connections of the road region are generated.

In Processing Step S4, a shape interpolation point of a road is acquired from the map data contained by the autonomous driving map database 8. Here, the shape interpolation point of the road is information configured to identify a shape of the road between the road points indicating the nodes, and expresses the shape of each lane.

In Processing Step S5, information about a lane L is generated from the acquired shape interpolation points.

In Processing Step S6, pre-connections, left and right connections, and post-connections for lanes are generated.

In Processing Step S7, lane information is managed hierarchically in the road region.

Figure 4:
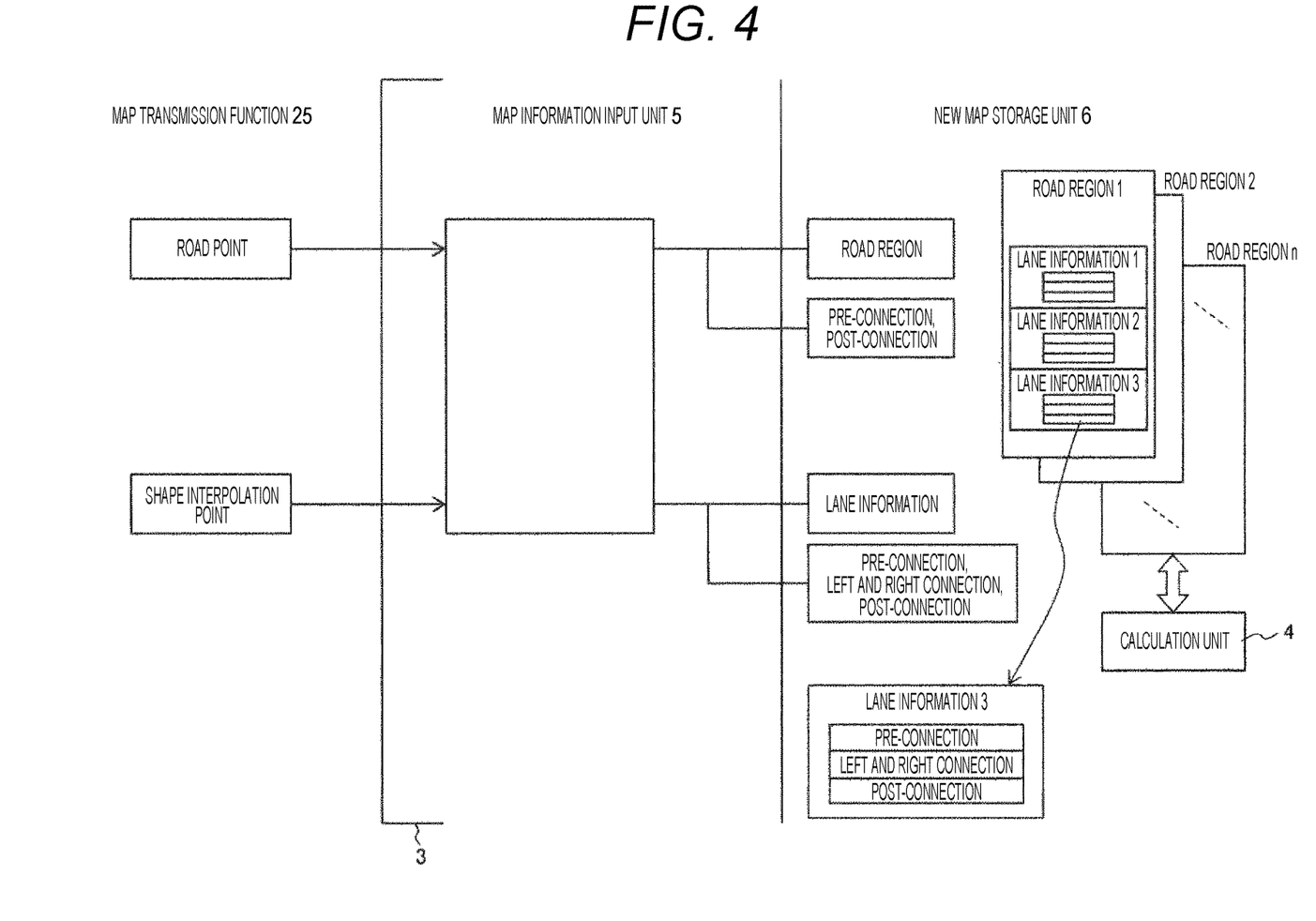
FIG. 4 is a diagram illustrating information obtained from a map transmission function 25 by the processing of FIG. 1, new information newly generated by the map information input unit 5 based on the obtained information, and a storage form of a new map information storage unit 6.

FIG. 4 illustrates the relationship among information obtained from the map transmission function 25 by the processing of FIG. 1, new information newly generated by the map information input unit 5 based on the obtained information, and a storage form of the new map information storage unit 6.

According to FIG. 4, the autonomous driving control device 3 acquires road points, shape interpolation points, and information associated therewith from an external map, and the map information input unit 5 newly generates each information about road region information, pre-connections and post-connections thereof, lane information, and pre-connections, left and right connections, and post-connections for lanes. Further, the new map information storage unit 6 hierarchically contains each information about the pre-connections, left and right connections, and post-connections of each lane information at the time for each obtained road region. Incidentally, the associated information includes information such as gradient and a curvature radius of a road and road type. Further, the calculation unit 4 of the autonomous driving control device 3 accesses the new map information storage unit 6 to obtain new map information and execute autonomous driving based on the new map information.

The above concept greatly reduces the labor required for verification of the format and the like in the calculation unit 4 and further facilitates acceptance of any map data by acquiring only the main connection information for connections among roads and lanes and generating the map data in a unified connection format regarding the map data developed by each company. Incidentally, the map data developed independently does not prescribe connections among roads such as intersections, branching, and merging, and lanes as unified ones, and the influence on the subsequent stage can be reduced by the unification here.

Figure 5:
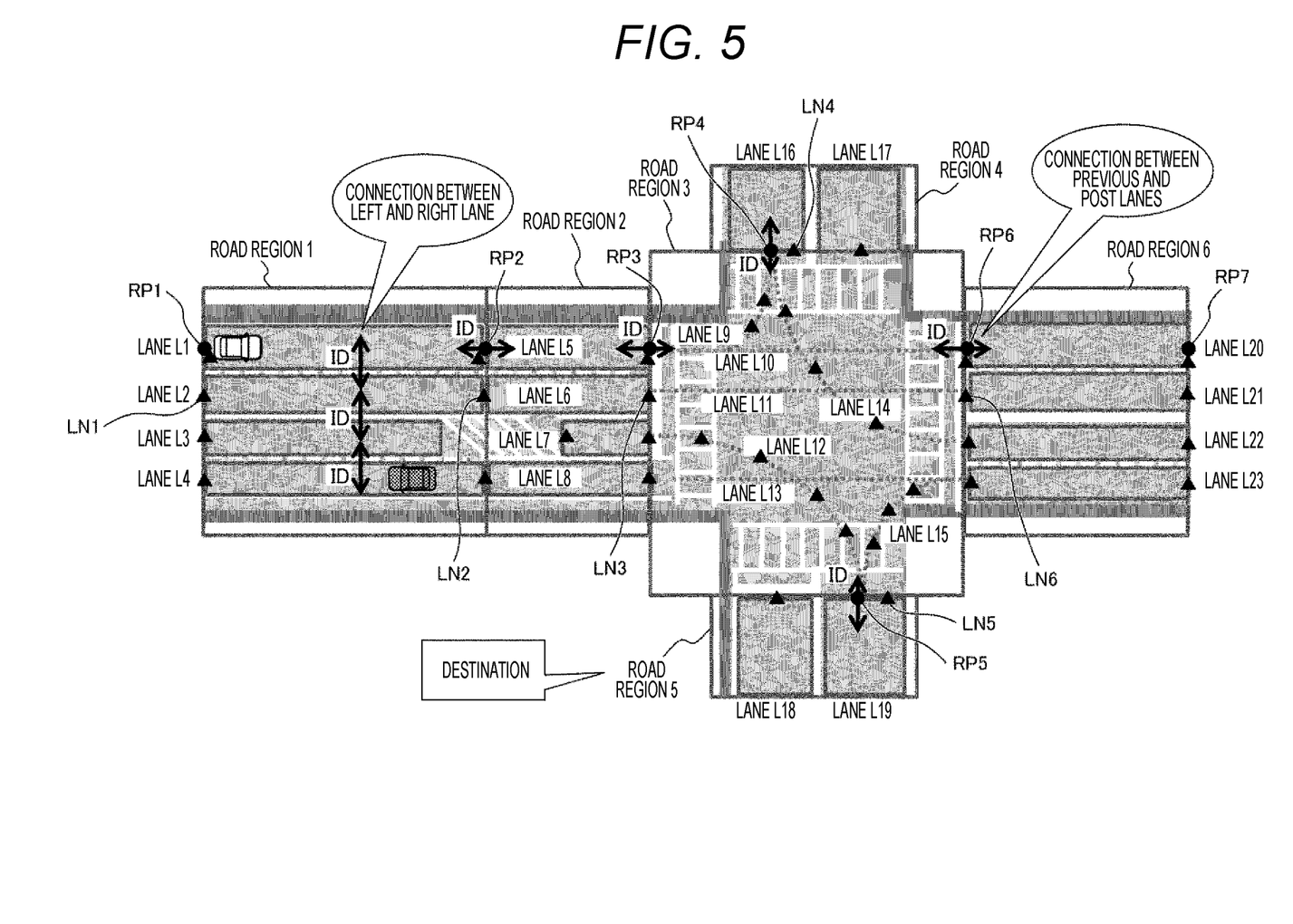
FIG. 5 is a view illustrating an example of a road including an intersection.

Hereinafter, the present invention will be described in more detail based on actual examples. As a premise thereof, roads including an intersection in FIG. 5 are assumed. The assumed roads are crossroads including the intersection, the inside of the intersection is represented as a road region 3, the right side of the intersection is represented as a road region 6, the left side of the intersection is represented as a road region 2, 1, the upper side of the intersection is represented as a road region 4, and the lower side of the intersection is represented as a road region 5. Incidentally, lanes L of the road region 6 are represented as lanes L20, L21, L22, and L23, lanes L of the road region 1 are represented as lanes L1, L2, L3, and L4, lanes L of the road region 2 are represented as lanes L5, L6, L7, and L8, lanes L of the road region 4 are represented as lanes L16 and L17, and lanes L of the road region 5 are represented by lanes L18 and L19, and lanes L of the road region 3, which is the intersection, are represented by lanes L9, L10, L11, L12, L13, L14, and L15.

The map data includes various types of information, but includes information about a road point RP as road level information. The road point RP here means a boundary position of the road region. FIG. 5 describes road points RP1 to RP6. Further, the map data includes information about a shape interpolation point LN as lane level information. The information about the shape interpolation point LN is information about a lane in the road region, the lane set at a position where the information about the road point RP is set or an arbitrary position. FIG. 5 describes the shape interpolation points LN1 to LN6 set at the same positions as the road points RP.

Figure 6:
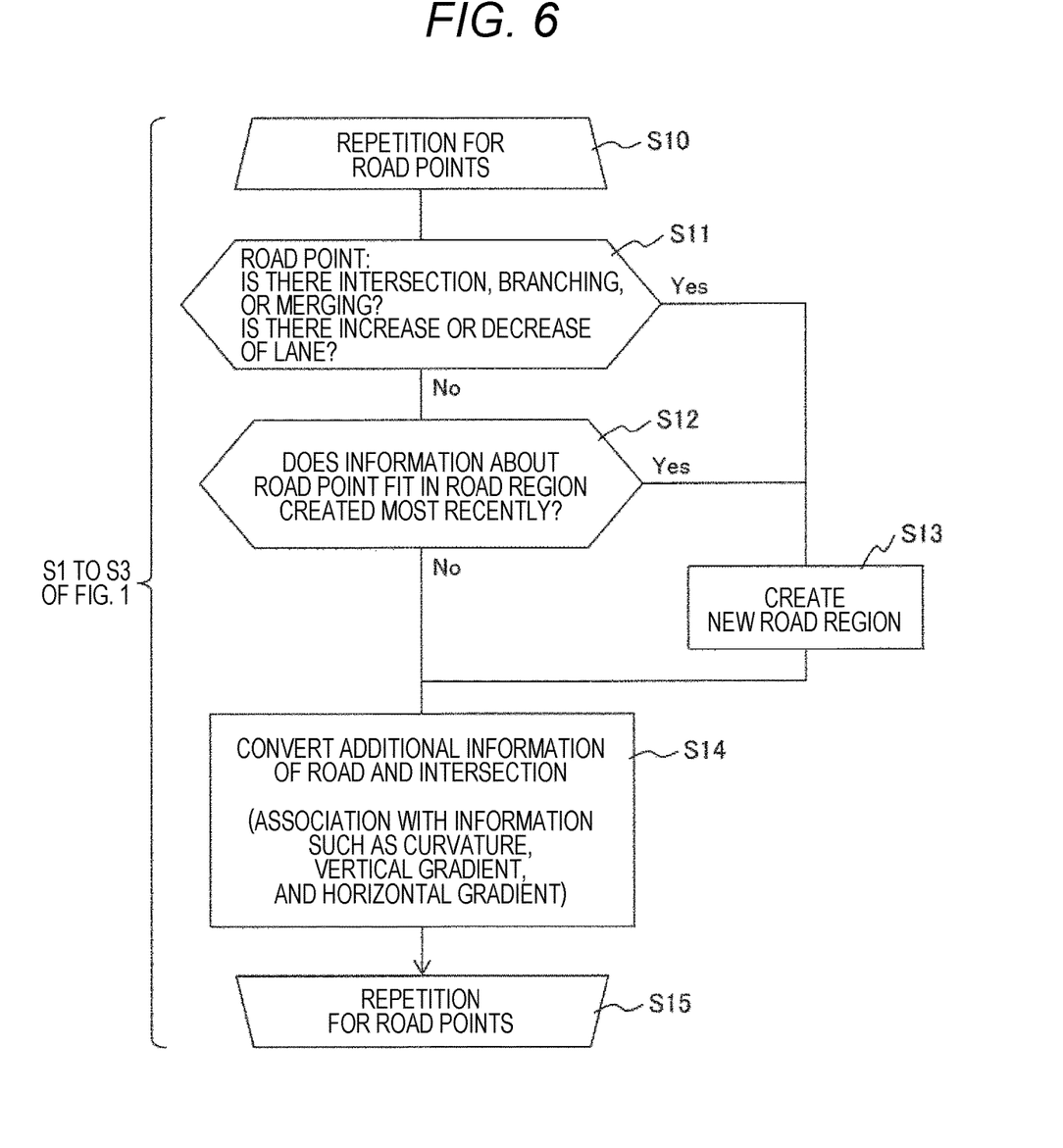
FIG. 6 is a flowchart describing a road region generation process (Processing Steps S1 to S3) in FIG. 1 in more detail.

FIG. 6 describes a road region generation process (Processing Steps S1 to S3) in FIG. 1 in more detail. However, the process of FIG. 6 is started when the acquired road point is not already converted.

In the first Processing Step S10 in the flowchart of FIG. 6, the repetitive processing before Processing Step S15 is set. Here, this means that the process from Processing Steps S11 to S14 for the acquired road points need to be executed for each of all road points, for example, when a vehicle approaches the intersection and the plurality of road points has been acquired. Incidentally, the plurality of road points are also acquired in the case of branching and merging.

In Processing Step S11, the intersection, branching, and merging are determined based on the acquired road points. The intersection, branching, and merging can be determined based on, for example, a change in the number of newly acquired road points with respect to the most recently acquired road points. For example, in the case of movement from the road point RP1 to RP2 in FIG. 5, there is no change in the number of road points, and thus, it is possible to determine that the vehicle travels straight, and the process proceeds to Processing Step S12. On the other hand, for example, at the road point RP3 in FIG. 5, the number of road points to be acquired next is three including RP4, RP5, and RP6, and this is determined as the intersection of the crossroads, and the process proceeds to Processing Step S13. Incidentally, the number of road points to be acquired next is two in the case of branching, and the number decreases from two to one in the case of merging. Thus, the intersection, branching, and merging can be determined. Alternatively, determination may be made including an increase or a decrease of lanes as necessary in Processing Step S11. Alternatively, the branching, merging, and intersection may be determined based on information added to the road point, for example, branching and merging information, a road type, and the like.

In the process of Processing Step S13 when it has been determined that the road is the intersection, branching, or merging, a new road region is created. The road region can be defined as a region between the previous and post road points RP. For example, when making a turn at the intersection, the road region to be newly created is preferably set to the road region at the intersection and a road region as a turning destination, but may be set in the other two directions. When the new road region is created, a storage area of a road region is newly set in the new map storage unit 6 as illustrated in FIG. 4. Further, the storage area of the road region that has passed is erased at an appropriate timing.

In Processing Step S12 at the time of traveling straight, it is confirmed whether or not the information about the new road point fits in the storage area of the road region created most recently. Since the vehicle travels straight, it is sufficient to divert and continuously use the storage area of the road region which has been created most recently if there is no great information change and it is sufficient to create a new road region in the process of Processing Step S13 if there is inconvenience in diversion.

Incidentally, when road points are arranged other than an intersection, branching, merging, and a lane increase regarding the handling of road points set on a straight road, road regions may be combined into one same road region. For example, when there are the road region 1 and the road region 2 in FIG. 5, both the road regions 1 and 2 can be handled as one and the same road region.

Incidentally, a connection relationship between the previous road region and the newly created road region has been determined by a series of processes from Processing Steps S11 to S13. That is, the relationship between the pre-connection (for example, the road region 1 is the pre-connection for the road region 2 in FIG. 5) and the post-connection (for example, the road region 3 is the post-connection for the road region 2 in FIG. 5) is known.

In Processing Step S14, additional information of the road and intersection is converted particularly for the newly created road region, and a curvature, a vertical gradient, a horizontal gradient, and the like are stored in association with the road region in a storage area of the newly created road region.

Figure 7:
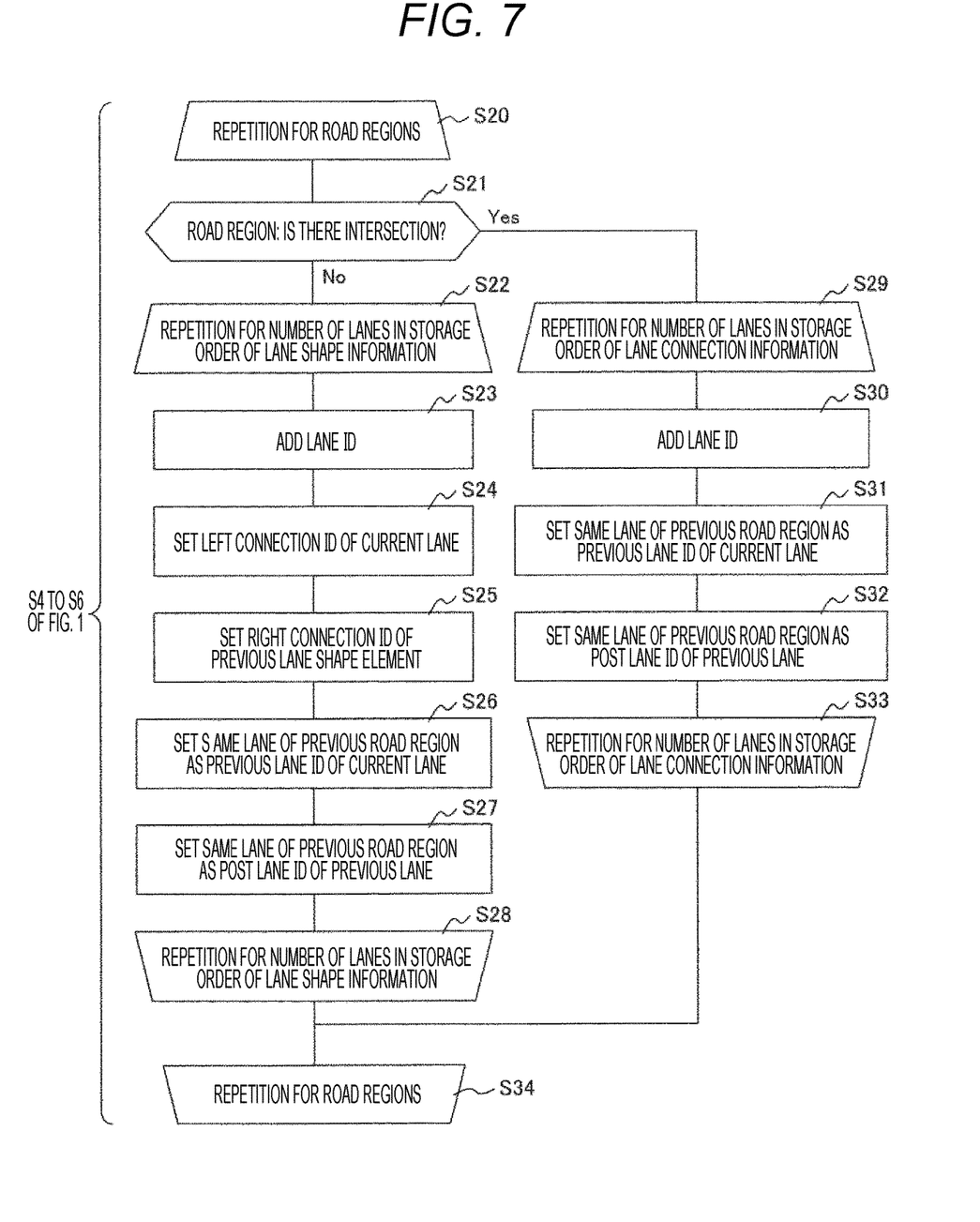
FIG. 7 is a flowchart describing a lane information generation process (Processing Steps S4 to S6) in FIG. 1 in more detail.

FIG. 7 describes a lane information generation process (Processing Steps S4 to S6) in FIG. 1 in more detail. However, the process of FIG. 7 is started when the acquired road point is not already converted.

In FIG. 7, there are three sets of repeated processing sections. Between Processing Step S20 and Processing Step S34, repetitive processing is performed for road regions until the processing of all the road regions is completed, and the repetitive processing is performed for the number of lanes until the processing of the entire number of lanes is completed between Processing Step S22 and Processing Step S28 and between Processing Step S29 and Processing Step S33.

In the processing flow of FIG. 7, it is assumed that the information about the shape interpolation point has been obtained at the start time. Incidentally, the shape interpolation point of the road is information configured to identify a shape of a road between road points indicating nodes, and includes information about the lane LN. For example, the road region 2 is a two-lane road on one side including the lanes LN5 and LN6 from the outer side, and includes information such as a road width.

In Processing Step S21, it is determined whether or not there is an intersection from the road region information. The process proceeds to Processing Step S29 if there is the intersection, and the process proceeds to Processing Step S22 if there is no intersection. This example is an example in which connection information is set as a structure having different lane shape information and lane connection information between the case of the intersection and the other case in S22 and S29, and the process needs to be performed differently case by case.

When there is no intersection, the process from Processing Step S22 to Processing Step S28 is repeatedly executed for the number of lanes in a storage order of the lane shape information. Here, for the road region 2, it is assumed that the lane shape information is arranged in the storage order of the lanes L5 and L6 from the outer side for each road point.

Within the repetitive processing, L5 is added as a lane ID to the first lane in Processing Step S23. Although a left connection ID of the current lane is set in Processing Step S24, but there is no left connection ID in this case. In Processing Step S25, a right connection ID of a previous lane shape element is set. In Processing Step S26, the same lane L1 of the previous road region (in this case, the road region 1) is set as a previous lane ID of the lane L5. In Processing Step S27, the same lane of the previous road region is set as a post lane ID of the previous lane.

In the repetitive processing, the lane L6 in the road region 2 is processed, and as a result, the previous and post connection relationships of the respective lanes (pre-connections and post-connections) and the relationship between the left and right connections (the adjacent lanes L5 and L6) are clarified. The information about the connection relationships regarding the lanes thus found is stored for each lane in the lane information set in the storage area for the road region 2 in the new map storage unit 6 illustrated in FIG. 4. As a result, the lane information is stored to be associated in a lower layer for every road region information.

When there is the intersection, the process from Processing Step S30 to Processing Step S33 is repeatedly executed for the number of lanes in a storage order of the lane connection information. Here, it is assumed that the lane connection information is stored in the storage order of L9, L10, L11, L12, L13, L14, and L15 for the road region 3 that is the intersection.

Within the repetitive processing, a lane ID is added to the first lane in Processing Step S30. In Processing Step S31, the same lane of the previous road region is set as a previous lane ID of the current lane. In Processing Step S32, the same lane of the previous road region is set as a post lane ID of the previous lane. Even in this case, the lane connection relationship is generated and stored.

Figure 8:
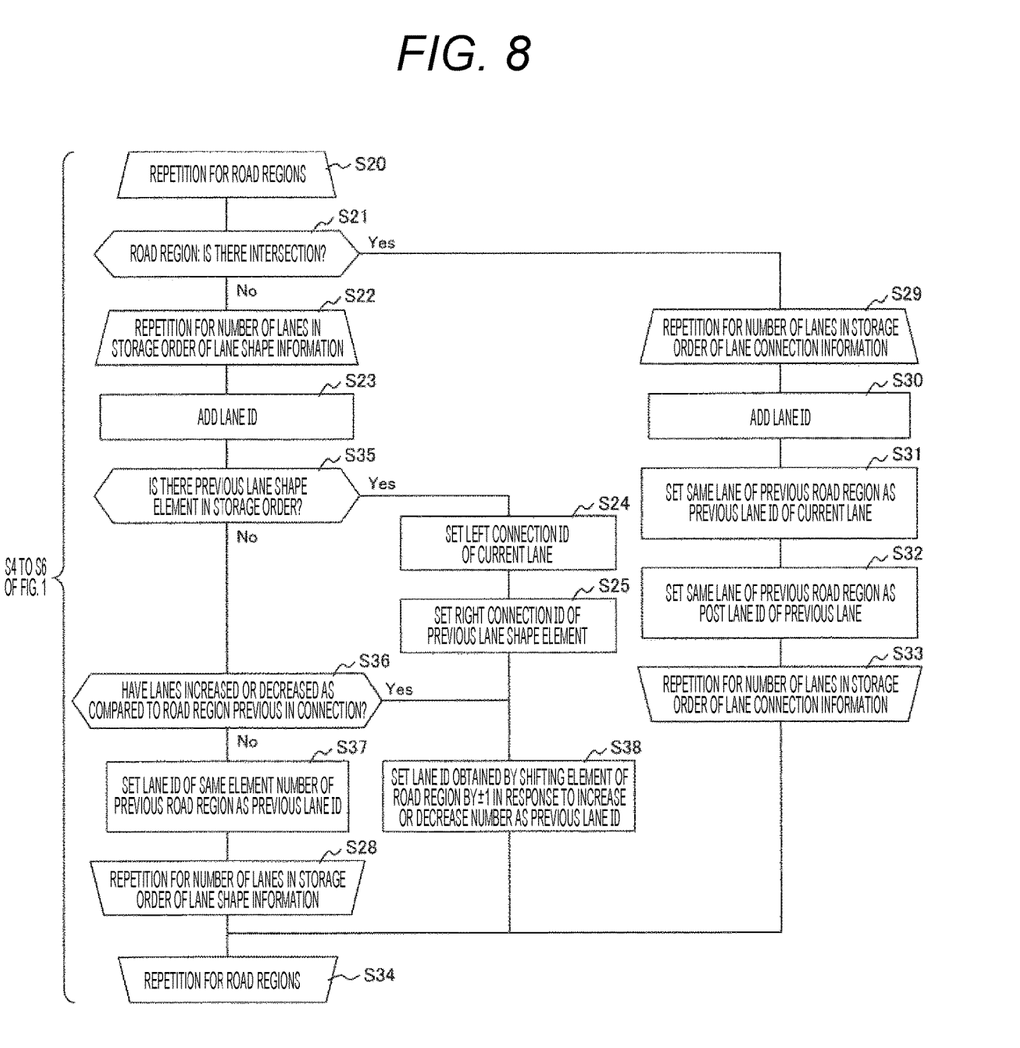
FIG. 8 is another flowchart describing a road region generation process (Processing Steps S4 to S6) of FIG. 1 in more detail.

FIG. 8 illustrates another example of lane information generation. There are other cases regarding the idea of lane information generation, and thus, only a brief description will be given here.

In Processing Step S21, it is determined whether or not there is an intersection from the road region information. The process proceeds to Processing Step S29 if there is the intersection, and the process proceeds to Processing Step S22 if there is no intersection. Incidentally, the processing on Processing Step S29 side in the case of the intersection is the same as that in FIG. 7, and thus, will not be described.

When there is no intersection, the process from Processing Step S22 to Processing Step S28 is repeatedly executed for the number of lanes in a storage order of the lane shape information. Here, for the road region 2, it is assumed that the lane shape information is arranged in the storage order of the lanes L5 and L6 from the outer side.

Among these, Processing Step S23 and Processing Step S23 are the same as those in FIG. 7, and the presence or absence of a previous lane shape element is confirmed in Processing Step S35. When the previous lane shape element is present, Processing Step S24 and Processing Step S25 are executed similarly to FIG. 7.

When there is no previous lane shape element, the process proceeds to Processing Step S36 to confirm whether the lanes have increased or decreased as compared to the previous road region. When the lanes have increased or decreased or after the processing of Processing Step S25, the process proceeds to Processing Step S38, and a lane ID obtained by shifting an element of the road region element by ±1 in response to an increase or decrease number is set to the previous lane.

When there is no lane increase or decrease, the process proceeds to Processing Step S37, and a lane ID having the same element number in the previous road region is set as the previous lane ID.

According to the embodiment of FIG. 8, the processing in response to the increase or decrease of lanes is possible.

The present invention described above aims to reduce the man-hour for development by absorbing the influence on applications even if the map/locator is changed, regarding an object that there occurs a problem that the man-hour for the development increases because a map format is independently developed by each map company and an application developer needs to understand the format and proceed with development each time.

This object is achieved by providing a map conversion service between the map/locator and the application and providing the map information input unit 5 configured to be used as a common processing unit for map information so that it is possible to reduce the man-hour by changing the map/locator without changing an interface of the application. The map conversion service converts map information of an original format from the map/locator to a common format and registers the converted format in a common format database (the new map information storage unit 6), and thus, the application reads the map information from the common format database (the new map information storage unit 6). Even if the map/locator is changed to a map/locator manufactured by another company, the change is absorbed by the map information input unit 5 so that it is unnecessary to change the application.

As a specific technique to obtain the common format database (the new map information storage unit 6), map/locator data is organized as an expression using a road point and a shape interpolation point. The road point is road level information, and the shape interpolation point is lane level information. In this regard, a data structure is hierarchized for a road region and a lane in the common format database (the new map information storage unit 6). For example, the road region is positioned at the top and lane information is placed to be subordinate to the road region.

Further, as connections among points, it is considered that a post road point, a branching/merging point (at the time of branching/merging, an intersection), lane connection information (within the intersection), and left and right connections of lanes are in the data storage order. In this regard, lane ID management is performed, and all connections to a post lane, a branching/merging lane, and left and right lanes are unified on the basis of the ID. Further, a recommended travel trajectory within the intersection is also expressed as one lane and unified.

REFERENCE SIGNS LIST 3 autonomous driving control device
4 calculation unit
5 map information input unit
6 new map information storage unit
8 autonomous driving map data
25 map transmission function
24 locator function
D1 engine
D2 steering
D3 brake
Dr vehicle control unit
S1 camera sensor
S2 radar sensor
U1 map/locator unit

The invention claimed is:

1. An autonomous driving control device comprising:
a map information input unit configured to input external map information;
a new map information storage unit in which new map information formed based on the input external map information is initially stored; and
a calculation unit which performs autonomous driving using the new map information,
wherein the map information input unit comprises: a first input means that acquires road points contained in the external map information; a first processing means that generates a road region from the road points; a second processing means that generates pre-connections and post-connections for the road region; a second input means that acquires shape interpolation points for a road contained in the external map information; a third processing means that generates information about lanes from the shape interpolation points for the road contained in the external map information; a fourth processing means that generates pre-connections, left and right connections, and post-connections for the lanes; and a fifth processing means that generates a storage area of the road region in the new map information storage unit, hierarchically constitutes a storage area of lane information within the storage area of the road region, and stores the road region and the shape interpolation points for the road, and information generated from the road region and the shape interpolation points for the road as new map information, and
the calculation unit performs the autonomous driving using the new map information obtained by accessing the new map information storage unit.

2. The autonomous driving control device according to claim 1, wherein
the first processing means that generates the road region from the road points determines an intersection and branching/merging based on the road points, and newly generates a road region.

3. The autonomous driving control device according to claim 1, wherein
the third processing means that generates the lane information from the road shape interpolation points contained in the external map information manages lane IDs depending on whether the road region is an intersection or not.

4. The autonomous driving control device according to claim 3, wherein
when the road region is the intersection, an identical lane of a previous road region and a current lane are associated as a previous or post lane.

5. The autonomous driving control device according to claim 4, wherein
when the road region is not the intersection, an identical lane of a previous road region and a current lane are associated as a previous or post lane, and a left and right connection relationship between a plurality of lanes is determined.

6. The autonomous driving control device according to claim 3, wherein
when the road region is not the intersection, an identical lane of a previous road region and a current lane are associated as a previous or post lane, and a left and right connection relationship between a plurality of lanes is determined.

7. An autonomous driving control method for inputting external map information, initially storing new map information formed from the input exei L map information, and performing autonomous driving using the new map information, the method comprising:
acquiring road points contained in the external map information and generating a road region and pre-connections and post-connections for the road region from the road points, acquiring shape interpolation points for a road contained in the external map information and generating information about lanes from the shape interpolation points, and generating pre-connections, left and right connections, and post-connections for the lanes;
generating a storage area of the road region for temporary storage of the new map information, hierarchically constituting a storage area of lane information within the storage area of the road region, and storing the road region and the shape interpolation points for the road, and information generated from the road region and the shape interpolation points for the road as new map information; and
performing the autonomous driving using the stored new map information.

* * * * *